United States Patent
Fukano et al.

[11] Patent Number: 5,584,466
[45] Date of Patent: Dec. 17, 1996

[54] SELF-HOLDING TYPE SOLENOID VALVES

[75] Inventors: Yoshihiro Fukano; Shinichi Azuma; Atsushi Nishibe, all of Tsukuba-gun, Japan

[73] Assignee: SMC Corporation, Tokyo, Japan

[21] Appl. No.: 326,944

[22] Filed: Oct. 21, 1994

[30] Foreign Application Priority Data

Oct. 21, 1993 [JP] Japan ................. 5-061416 U

[51] Int. Cl.$^6$ ............... F15B 13/044; F16K 31/08
[52] U.S. Cl. ................. 251/65; 335/234; 251/129.15
[58] Field of Search ............... 137/625.65; 251/65, 251/129.15; 335/234

[56]  References Cited

U.S. PATENT DOCUMENTS

| | | | |
|---|---|---|---|
| 3,368,788 | 2/1968 | Padula | 251/65 |
| 3,379,214 | 4/1968 | Weinberg | 251/65 X |
| 3,458,769 | 7/1969 | Stampfli | 335/234 |
| 3,683,239 | 8/1972 | Sturman | 335/234 X |
| 3,821,967 | 7/1974 | Sturman et al. | 251/65 X |
| 4,056,255 | 11/1977 | Lace | 251/65 X |
| 4,403,765 | 9/1983 | Fisher | 251/65 |
| 4,720,078 | 1/1988 | Nakamura et al. | 251/129.15 |
| 4,758,811 | 7/1988 | Slavin et al. | 335/234 |
| 5,127,625 | 7/1992 | Kleinhappl | 251/65 X |
| 5,259,416 | 11/1993 | Kunz et al. | 251/65 X |

FOREIGN PATENT DOCUMENTS 1-234672  9/1989  Japan ............... 251/129.15

*Primary Examiner*—Gerald A. Michalsky
*Attorney, Agent, or Firm*—Oblon, Spivak, McClelland, Maier & Neustadt, P.C.

[57]  ABSTRACT

A self-holding type solenoid valve has an exciting coil 1 and an exciting circuit that switches the direction of flow of exciting current passing through the coil. When a positive exciting current flows through the coil, a movable iron core is attracted to a stationary iron core and held in the attracted position by a self-contained permanent magnet. When a reversed current flows through the coil, a return spring releases the movable iron core away from the stationary iron core.

1 Claim, 2 Drawing Sheets

SELF-HOLDING TYPE SOLENOID VALVES

FIELD OF THE INVENTION

This invention relates to self-holding type solenoid valves that maintain their operating condition by means of a permanent magnet.

DESCRIPTION OF THE PRIOR ART

One example of self-holding type solenoid valves employing a permanent magnet is disclosed in Japanese Provisional Patent Publication No. 297883 of 1988. This self-holding type solenoid valve comprises a main valve segment including a valve member that switches the direction of flow of fluid between multiple ports and a solenoid segment that actuates the valve member. The solenoid segment comprises a bobbin surrounded by two coils of wire, a magnetic frame and a magnetic plate surrounding the bobbin, a stationary iron core and a self-holding permanent magnet fitted to the center hole in the bobbin, and a movable iron core slidably fitted in the same center hole in the bobbin. When one of the two coils of wire is energized, the movable iron core is attracted to the stationary iron core, whereupon the valve member moves to switch the flow of liquid between the ports and the self-contained permanent magnet holds the movable iron core in the attracted position. When the other coil is energized, the movable iron core is released from the stationary iron core and the valve member returns to its original position.

The conventional self-holding type solenoid valve just described requires two coils of wire, one attracting the movable iron core to the stationary iron core and the other releasing the movable iron core from the attracted position in which it is held by means of the self-contained permanent magnet. Because of the two coils occupying a large space, the solenoid segment and the solenoid valve become larger than is desired.

SUMMARY OF THE INVENTION

A primary object of this invention is to provide a small and simple self-holding type solenoid valve that provides a function to attract a movable iron core to a stationary iron core and a function to release the movable iron core from the attracted position with only one coil of wire.

Another object of this invention is to provide a self-holding type solenoid valve featuring high magnetic efficiency and fast response.

To achieve the objects, a self-holding type solenoid valve according to this invention comprises a main valve segment comprising multiple ports and a valve member to switch the direction of flow of fluid therebetween, a solenoid segment comprising an exciting coil wound around a bobbin, a stationary iron core and a self-holding permanent magnet fastened to the center hole in the bobbin, a movable iron core to actuate the valve member inserted in the center hole in the bobbin so as to be slidable toward and away from the stationary iron core and a return spring that urges the movable iron core away from the stationary iron core, the movable iron core being attracted to the stationary iron core and held in the attracted position by the self-contained permanent magnet when an exciting current flows in the positive direction through the coil and released away from the stationary iron core when the exciting current is reversed, and an exciting circuit that switches the direction of the exciting current flowing through the coil of the solenoid segment.

The stationary iron core of a preferable embodiment of this invention has a step that engages with a step provided in the center hole in the bobbin. The stationary iron core and permanent magnet are fastened in the center hole by means of a set nut of ferromagnetic material screwed in the magnetic frame around the bobbin that presses the permanent magnet toward the stationary iron core.

More specifically, a screw driven into the set nut fastens a plate to the outside of the solenoid segment. The plate thus fastened forms a case that contains a printed circuit board carrying the exciting circuit mentioned before.

When the exciting circuit passes the exciting current in the positive direction, a resultant force comprising the magnetic forces generated by the coil and the permanent magnet attracts the movable iron core to the stationary iron core, whereupon the valve segment moves to switch the direction of flow of fluid between the multiple ports. Even if the exciting current is subsequently cut off, the self-contained permanent magnet keeps the movable iron core in the attracted position and the valve segment in the switched position.

When the direction of the exciting current is reversed, the magnetic forces generated by the coil and the permanent magnet offset each other, thereby decreasing the attraction force between the movable and stationary iron cores, whereupon the force exerted by the return spring releases the movable iron core away from the stationary iron core. Then, the valve member also moves to switch the direction of flow of fluid.

Thus, the self-holding type solenoid valve of this invention with only one coil achieves the attraction of the movable iron core to the stationary iron core and the release of the former away from the latter by switching the direction of the exciting current passed therebetween.

This feature permits designing small and simple self holding type solenoid valves.

DETAILED DESCRIPTION OF THE PREFERRED EMBODIMENTS

Figure 1:
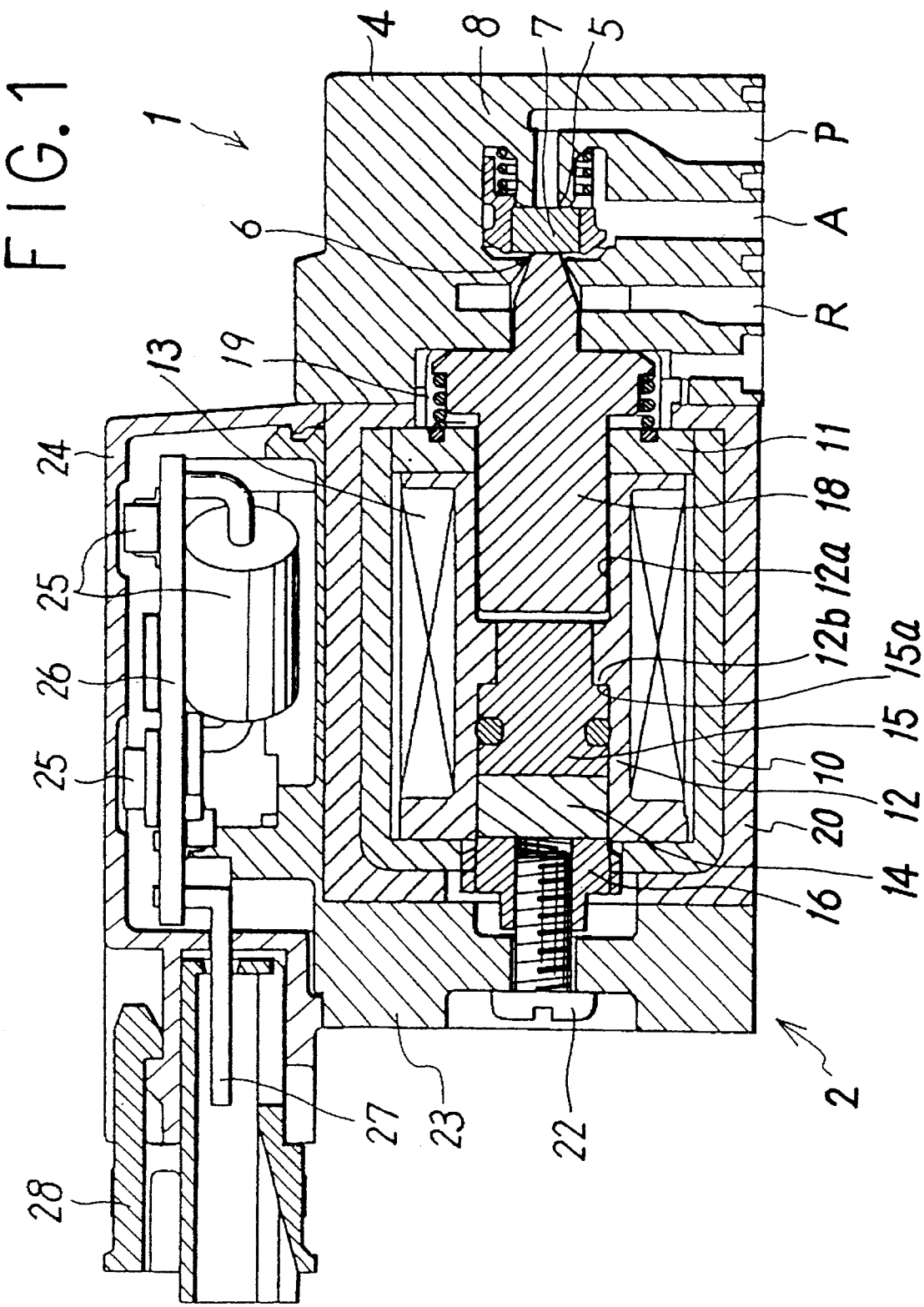
FIG. 1 is a vertical front view of a self-holding type solenoid valve according to this invention.

FIG. 1 shows a self-holding type solenoid valve according to this invention comprising a main valve segment 1 having a valve member 7 that switches the direction of flow of compressed air, a solenoid segment 2 that actuates the valve member 7, and an exciting circuit 3 that controls the exciting current supplied to the solenoid segment 2.

The main valve segment 1 comprises a valve body 4 that has an inlet port P, an outlet port A and a discharge port R through which the compressed air flows. An inlet valve seat 5 between the outlet port A and the inlet port P and a discharge valve seat 6 between the outlet port A and the discharge port R are located opposite each other. Between the two valve seats 5 and 6 is disposed the valve member 7 that is urged toward the discharge valve seat 6 by a valve spring 8 interposed between the valve member 7 and the valve body 4. The face of the valve member 7 on the side of the discharge valve seat 6 is in contact with the tip of a movable iron core 18 projecting from the solenoid segment 2.

The solenoid segment 2 comprises a magnetic frame 10 and a magnetic plate 11 that, in combination, form a magnetic path, a bobbin 12 contained within the magnetic frame 10 and plate 11, a coil of wire 13 wound around the bobbin 12, and a self-holding permanent magnet 14 and a stationary iron core 15 that are fastened in a center hole 12 a in the bobbin 12. The permanent magnet 14 and stationary iron core 15 are fastened in the center hole 12 a by engaging a step 15 a on the stationary iron core 15 with a step 12b in the center hole 12a, with the permanent magnet 14 placed behind the stationary iron core 15 pressed against the stationary iron core 15 by means of a set nut 16 of ferromagnetic material screwed into the magnetic frame 10.

This fastening method permits the stationary iron core 15 to be always fastened in a fixed position even when the permanent magnet 14 is not made exactly to the design size specification, thus keeping the stroke of the movable iron core 18 within the preset range. It also assures that the stationary iron core 15 and the permanent magnet 14 are always kept in close contact with each other, thereby decreasing the occurrence of leakage flux. The set nut 16 that is made of ferromagnetic material and forms a part of the magnetic path increases the magnetic efficiency of the permanent magnet 14.

The movable iron core 18 is inserted in the center hole 12 a in the bobbin 12 in such a manner as to come in and out of contact with the stationary iron core 15. A return spring 19 placed between the movable iron core 18 and the magnetic plate 11 urges the movable iron core 18 away from the stationary iron core 15. The tip of the movable iron core 18 passes through the discharge valve seat 6 and comes in contact with the valve member 7, thus pressing the valve member 7 against the inlet valve seat 5 when the coil is not excited.

A mold 20 of electrically insulating resin covers the outside of the magnetic frame 10. A fitting bolt 22 screwed through the set nut 16 fastens a plate 23 to the outside of the mold 20. A case 24 attached to one side of the plate 23 contains a printed circuited board 26 carrying necessary electric and electronic components 25. Electricity is supplied from a socket 28 to three power-supply terminals 27 (only one of them is shown) that are electrically connected to a printed circuit on the printed circuit board 26.

Figure 2:
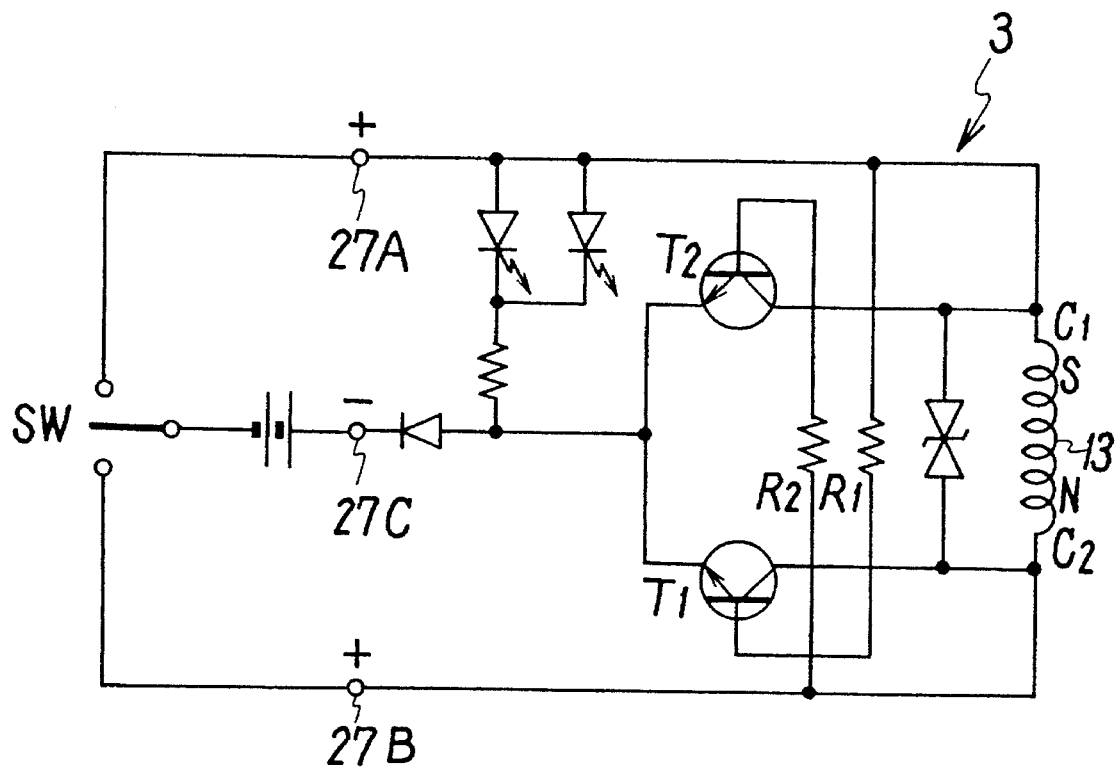
FIG. 2 is a diagram showing an exciting circuit according to this invention.

FIG. 2 shows an example of the exciting circuit 3 that excited the coil 13. The exciting circuit 3 is formed on the surface of the printed circuit board 26 and has a setting terminal 27A, a resetting terminal 27B and a common terminal 27C.

When a switch SW is actuated to connect the common terminal 27C to the setting terminal 27A, base current flows through a resistor $R_1$ to a transistor $T_1$, whereupon the emitter and collector of the transistor T are electrically connected to pass current from $C_1$ to $C_2$ of the coil 13 and $C_1$ and $C_2$ of the coil 13 are defined as a south and a north pole. When the polarity of the permanent magnet 14 is made equal to that of the coil 13, therefore, the attraction forces of the coil 13 and permanent magnet 14 are combined into a strong composite force that attracts the movable iron core 18 to the stationary iron core 15. At the same time, the valve member 7 urged by the valve spring 8 opens the inlet valve seat 5 and closes the discharge valve seat 6. Once the movable iron core 18 has been attracted to the stationary iron core 15, the attraction force of the permanent magnet 14 keeps the movable iron core 18 in the attracted position and the valve member 7 in the actuated position described before, thereby allowing the fluid to flow in the same direction, even if the current supply from the exciting circuit 3 is cut off.

When the switch SW connects the common terminal 27C to the resetting terminal 27B, base current flows through a resistor $R_2$ to a transistor $T_2$, thereby electrically connecting the emitter and collector of the transistor $T_2$, passing current from $C_2$ to $C_1$ of the coil 13, and thus reversing the polarity thereof. As a consequence, the attraction forces of the permanent magnet 14 and coil 13 repel and offset each other. Then, the force with which the movable iron core 18 is attracted to the stationary iron core 15 becomes smaller than the urging force the return spring 19. Therefore, the movable iron core 18 is released from the attracted position and urged back to the illustrated position by the return spring 19. Pushed by the movable iron core 18, the valve member 7 returns to the illustrated position, thereby opening the discharge valve seat 6 and closing the inlet valve seat 5.

As described above, the self-holding type solenoid valve having the permanent magnet 14 and the single coil 13 causes the movable iron core 18 to be attracted to the stationary iron core 15 and held in the attracted position and released therefrom by switching the direction of flow of electric current passing through the coil 13.

Figure 3:
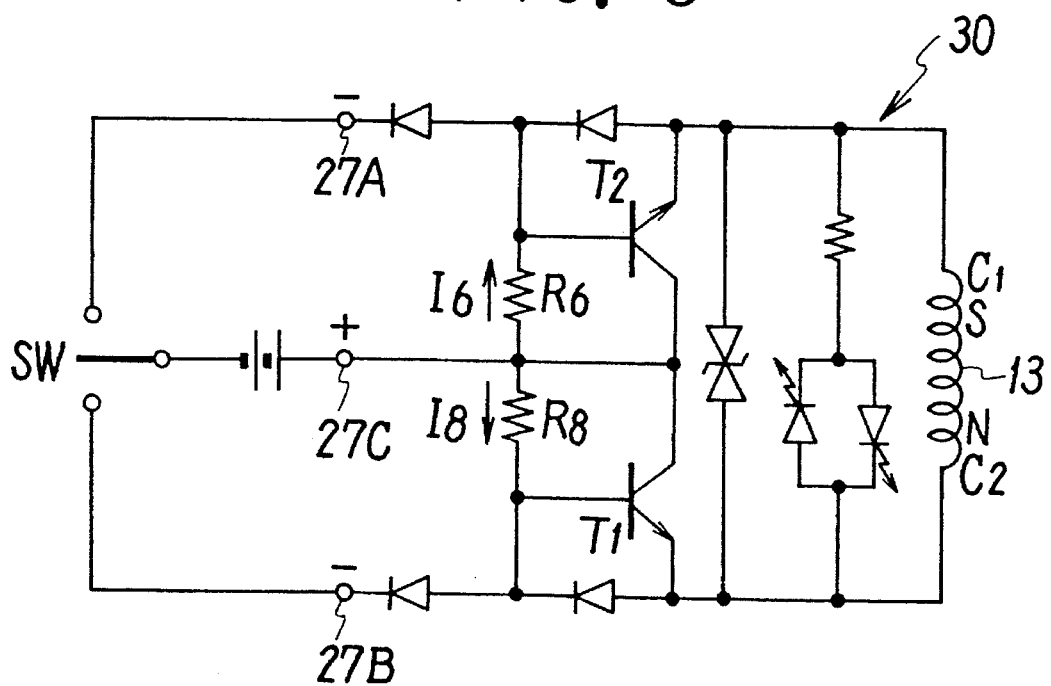
FIG. 3 is a diagram showing another exciting circuit according to this invention.

FIG. 3 shows another example of the exciting circuit 3. This exciting circuit 30 has a protective function that keeps diodes, transistors and other circuit components from burning even when both terminals 27A and 27B are simultaneously connected to the common terminal 27C by some program error or other causes.

When the switch SW in the exciting circuit 30 connects the common terminal 27C to the setting terminal 27A, the transistor $T_2$ remains unexcited because the base of the transistor $T_2$ is grounded and the current $I_6$ passing through a resistor $R_6$ flows to the terminal 27A and not to the base of the transistor $T_2$. On the other hand, the current $I_8$ passing through a resistor $R_8$ flows to the base of the transistor $T_1$ to excite the transistor $T_1$ as the setting terminal 27B is kept open. Therefore, the current from the terminal 27C flows through the transistor $T_1$ and the coil 13, from $C_1$ to $C_2$ and then to the terminal 27A.

When the common terminal 27C is connected to the setting terminal 27B, the transistor $T_1$ becomes deexcited, while the current $I_6$ flowing through the resistor $R_6$ excites the transistor $T_2$. Then, the current from the terminal 27C flows through the transistor $T_2$ and from $C_2$ to $C_1$ through the coil 13.

Even when both terminals 27A and 27B are simultaneously connected to the common terminal 27C by some unexpected cause, the current $I_6$ flows to the terminal 27A while the current $I_8$ flows to the terminal 27B. Therefore, the base current does not flow to either of the transistors $T_1$ and $T_2$which are thus kept unexcited. Consequently, the exciting current does not flow through the coil 13, and the solenoid valve gives rise to no malfunction.

Burning of the transistors $T_1$ and $T_2$, power supply unit and other apparatus can be prevented by making the resistance of the resistors $R_6$ and Rlarge enough while keeping bypass currents $I_6$ and $I_8$ at approximately 10 mA.

When current is passed through the coil 13 in the self-holding type solenoid valve thus constructed, the stationary iron core 15 attracts the movable iron core 18. Then, the valve member 7 opens the inlet valve seat 5, while the magnetic force of the permanent magnet 14 keeps the movable iron core 18 in the attracted position. Therefore, the valve member 7 keeps open the inlet valve seat 5 even when the current supply to the coil 13 is cut off by program or by power failure or other accidents.

Provision of the permanent magnet 14 in the center hole 12a in the bobbin permits making the size of the solenoid segment 2 smaller than that on the conventional solenoid valves whose permanent magnet 14 is mounted outside on the outside of the magnetic frame 10. This design also decreases the leakage flux from the permanent magnet 14 and increases the attraction force by approximately '10 percent.

Furthermore, the single coil 13 in the solenoid segment 2 serves the dual function of attracting the movable iron core 18 to the stationary iron core 15 and of releasing the movable iron core 18 away from the position in which it is kept by the force of the permanent magnet 14 by switching the direction of flow of electric current passing therethrough. Therefore, this dual-function single coil requires only half as much coiling space, as compared with the conventional two coils individually performing one of the two functions described above. This results in a smaller solenoid segment and a smaller self-holding type solenoid valve. If the single coil of this invention is provided on the twice as large space on a conventional bobbin, approximately twice as large an of attraction force will be obtained.

What is claimed is:

1. A self-holding type solenoid valve comprising:

a main valve segment having multiple ports and a valve member to switch communication therebetween;

a solenoid segment comprising an exciting coil wound around a bobbin, a stationary iron core and a self-holding permanent magnet fastened in a center hole in the bobbin, a movable iron core to actuate the valve member inserted in the center hole in such a manner as to be slidable toward and away from the stationary iron core, and a return spring urging the movable iron core away from the stationary iron core, the movable iron core being attracted to the stationary iron core to an attracted position and held thereat by the permanent magnet when a positive exciting current flows through the exciting coil, wherein an attraction force of the permanent magnet holds the movable iron core in the attracted position even after the exciting current is cut off, and the movable iron core is released away form the stationary iron core to a released position when a reversed exciting current flows through the exciting coil and can be maintained in the released position even after the exciting current is cut off; and an exciting circuit switching a direction of flow of the exciting current flowing through the exciting coil in the solenoid segment;

wherein:

a step on the stationary iron core engages with a step in the center hole in the bobbin, the permanent magnet being mounted on a back of the stationary iron core, and the stationary iron core and permanent magnet being fastened in the center hole by means of a set nut of ferromagnetic material that presses the permanent magnet against the stationary iron core, the set nut being screwed into a magnetic frame surrounding the bobbin and forming a part of a magnetic path; and a bolt screwed into the set nut fastens a plate to an outside of the solenoid segment and a case formed on the plate contains a printed circuit board carrying the exciting circuit.

* * * * *